United States Patent
Lundgren

(10) Patent No.: US 8,839,997 B2
(45) Date of Patent: Sep. 23, 2014

(54) LOAD CARRIER FOOT

(75) Inventor: Anders Lundgren, Grimsås (SE)

(73) Assignee: Thule Sweden AB, Hillerstorp (SE)

( * ) Notice: Subject to any disclaimer, the term of this patent is extended or adjusted under 35 U.S.C. 154(b) by 603 days.

(21) Appl. No.: 13/144,695

(22) PCT Filed: Jan. 12, 2010

(86) PCT No.: PCT/EP2010/050282
§ 371 (c)(1),
(2), (4) Date: Oct. 18, 2011

(87) PCT Pub. No.: WO2010/081799
PCT Pub. Date: Jul. 22, 2010

(65) Prior Publication Data
US 2012/0031942 A1 Feb. 9, 2012

(30) Foreign Application Priority Data

Jan. 14, 2009 (EP) .................... 09150548

(51) Int. Cl.
*B60R 9/04* (2006.01)
*B60R 9/00* (2006.01)
*B60R 9/058* (2006.01)
*B60R 11/00* (2006.01)

(52) U.S. Cl.
CPC .................. *B60R 9/058* (2013.01)
USPC ............. 224/331; 224/309; 224/329

(58) Field of Classification Search
CPC .......... B60R 9/058; B60R 7/08; B60R 11/00; B60R 2011/0059
USPC ................. 224/558, 309, 321, 329, 331, 545
See application file for complete search history.

(56) References Cited

U.S. PATENT DOCUMENTS

| 3,638,844 | A | * | 2/1972 | Bronson | 224/319 |
| 3,837,547 | A | * | 9/1974 | Joos | 224/331 |
| 4,496,089 | A | * | 1/1985 | Eklund | 224/329 |
| 4,688,706 | A | * | 8/1987 | Thulin | 224/329 |
| 4,809,943 | A | * | 3/1989 | Taschero | 248/503 |
| 4,877,169 | A | * | 10/1989 | Grim | 224/331 |

(Continued)

*Primary Examiner* — Justin Larson
*Assistant Examiner* — Lester L Vanterpool
(74) *Attorney, Agent, or Firm* — Novak Druce Connolly Bove + Quigg LLP

(57) ABSTRACT

The present invention relates to a load carrier foot (1) for mounting at least a part of a load carrier to a first surface (2) of a vehicle. The load carrier foot (1) comprising a support member (3), arranged to abut the first surface (2), a gripping member (5) having a first part (16) arranged to abut the vehicle at a distance from the support member (3), an intermediate member (9) between the support member (3) and a second part (17) of the gripping member (5), and an adjustment member (7) acting on the intermediate member (9) to adjust a clamping force between the support member (3) and the first part (16) of the gripping member (5). The intermediate member (9) cooperates with the second part (17) of the gripping member (5) at a first working point (10) and the intermediate member cooperates with the support member (3) at a second working point (11) located at a distance (D) from the first working point (10). The distance (D) between the first and the second working points (10, 11) can be changed by moving at least a part of the intermediate member (9) via the adjustment member (7), to thereby vary the clamping force between the first part (16) of the gripping member (5) and the support member (3). The present invention provides for a space saving arrangement and an arrangement which has improved safety aspects.

19 Claims, 5 Drawing Sheets

(56) References Cited

U.S. PATENT DOCUMENTS

| | | | |
|---|---|---|---|
| 5,104,020 A * | 4/1992 | Arvidsson et al. | 224/331 |
| 5,366,128 A * | 11/1994 | Grim | 224/330 |
| 5,641,107 A * | 6/1997 | Mann | 224/331 |
| 5,785,474 A * | 7/1998 | Kinouchi et al. | 410/96 |
| 6,516,985 B1 * | 2/2003 | Lundgren | 224/331 |
| 6,641,012 B1 * | 11/2003 | Lundgren | 224/331 |
| 6,662,982 B1 * | 12/2003 | Pakkila | 224/329 |
| 7,434,713 B2 * | 10/2008 | Linden | 224/326 |

* cited by examiner

LOAD CARRIER FOOT

TECHNICAL FIELD

The present invention relates to a load carrier foot for mounting at least a part of a load carrier to a first surface of a vehicle by means of a clamping force between a gripping member and a support member.

BACKGROUND

A load carrier foot is previously known from the patent publication with the U.S. Pat. No. 6,516,985, which discloses a load carrier bar extending transversely over a roof of a vehicle and being secured at each opposing side edge region thereof by means of a load carrier foot. The load carrier foot, has a support portion for abutment against the roof of the vehicle and a clamping portion for clamping against an edge portion of the roof. A rotary shaft arranged at the end region of the load carrier bar is rotated to impart a clamping force between the support portion and the clamping portion after assembly.

For operating the clamping portion, the foot includes an operating mechanism movable in the longitudinal direction of the load carrier bar and a vertically extending slot housing a pin of a rocker. The rocker is pivoted via an axle in the load carrier foot. The rocker exhibits a triangular formed metal sheet, the axle being located at one of the corners. The second and third corner of the rocker each comprises a pin. The pin of one of the corners pivotally connects the rocker with the clamping portion.

When the operating mechanism is displaced in the longitudinal direction of the load carrier by means of the rotary shaft, the rocker will be pivoted about the axle, whereby the clamping portion will impart a clamping force for retaining the load carrier on the vehicle. The load carrier foot will be satisfactory at normal load. However, the clamping arrangement of the load carrier foot have been shown to be less favorable when exerted to load peaks, such as imparted by a sudden deceleration of the vehicle, e.g. braking, or a collision. Furthermore, the arrangement is rather space consuming.

SUMMARY OF INVENTION

The above mentioned drawbacks are at least partly solved or minimised by the present invention and more specifically by a load carrier foot for mounting at least a part of a load carrier to a first surface of a vehicle. The load carrier foot comprises a support member, arranged to abut the first surface, a gripping member having a first part arranged to abut the vehicle at a distance from the support member, an intermediate member arranged between the support member and a second part of the gripping member, and an adjustment member acting on the intermediate member to adjust a clamping force between the support member and the first part of the gripping member. The intermediate member further cooperates with the second part of the gripping member at a first working point and it cooperates with the support member at a second working point located at a distance from the first working point.

The distance between the first and the second working points can be varied. More specifically, the distance between the first and the second working points is can be changed by moving at least a part of the intermediate member via the adjustment member to thereby vary the distance and/or the clamping force between the first part of the gripping member and the support member. Dependent upon embodiment, the distance can be either increased or decreased, as the adjustment member is tightened.

The present invention provides for a load carrier foot which requires a relatively small volume for the clamping arrangement as the distance between the working points can be changed while still maintaining proper clamping capabilities. Furthermore, the load carrier foot is easy to mount and to tighten. It is also believed that e.g. in a case of a sudden retardation of a vehicle using a load carrier foot according to the present invention, the clamping force of the load carrier foot is temporarily increased, as the increase in momentary load exerted on the load carrier foot is temporarily increased during the retardation of the vehicle.

In an embodiment according to the present invention, the intermediate member is pivotally connected to the support member at the second working point. This enables a substantially pending motion of the intermediate member during adjustment of the intermediate member by means of the adjustment member and provides for a good force transfer from the adjustment member, via the intermediate member to the gripping member.

In an embodiment according to the present invention, the first working point comprises a shoulder providing a slideable path. The shoulder can be arranged on the intermediate member. As mentioned, the shoulder defines a path along which e.g. a surface of the gripping member, e.g. at least a part of the second part of the gripping member is arranged to movably slide along, upon movement of at least a part of the intermediate member. The mentioned shoulder can be a flanged edge for example. The mentioned second part of the gripping member can be a pin.

In an embodiment according to the present invention, the adjustment member can be pivotally mounted to the intermediate member at a pivot point. The pivot point can be arranged between the shoulder and the support member. Optionally the adjustment member is pivotally mounted to the intermediate member at a pivot point and the first working point is arranged between the support member and the second working point.

In an embodiment according to the present invention, the intermediate member comprises a first and a second side edge, the first side edge faces the gripping member and the second side edge faces away from the gripping member. Wherein the shoulder exhibits an inclined surface that extends substantially between the first and second side edges. It should be noted that the inclined surface does not need to extend the full length between the first and the second side edge of the intermediate member, only the operative length of the slideable distance of the shoulder needs to incline. The inclining surface can be arched, e.g. convex or concave, or flat dependent upon the desired clamping characteristics. The inclined surface can also be provided with smaller projections, e.g. saw tooth projections, enabling a stepwise temporary locking of the corresponding second part of the gripping member from motion in the opposite direction.

The inclined surface of the shoulder can be configured to incline so that the distance between the working points is increased when at least a part of the intermediate member is moved in a direction towards the gripping member. This configuration enables a simple yet effective force translation of the imparted force, between the intermediate member, gripping member and the adjustment member.

In an embodiment according to the present invention, the adjustment member extends at least between the intermediate member and the gripping member. This provides for a lever effect between the intermediate member and the gripping member. The adjustment member can further be arranged to move at least a part of the intermediate member by means of a rotating motion of the adjustment member. This can be achieved when the adjustment member comprises a threaded pin, e.g. a screw or a bolt for example.

The adjustment member can be configured to extend through an opening in the gripping member. The adjustment member can further be in working cooperation with the opening in the gripping member, for example, the opening or at least apart of the opening, or at least a part of the surface surrounding the opening, can be used to provide a pivot function to the adjustment member. As such, the adjustment member is pivotally mounted on the gripping member. Such a pivot function can be advantageous as the intermediate member and the gripping member are imparted with a relative motion with respect to each other.

In an embodiment according to the present invention, the adjustment member can be pivotally connected to the intermediate member, e.g. by means of a threaded nut in working cooperation with a threaded pin of the adjustment member during mounting of the load carrier foot. It if of course possible that the intermediate member exhibits a pivotally mounted adjustment member and that the gripping member exhibits a pivotally connected adjustment member. It is further possible that the adjustment member is integral with the gripping member or the intermediate member.

Furthermore, or optionally, a body can be arranged to extend from the support member to a bracket for connection to a load carrier bar. The body can be provided with a guide track cooperating with a pin for guiding the gripping member along a geometrically correct path. This embodiment of the present invention provides for an additional safety arrangement.

In an embodiment of the present invention, the second working point is arranged between the support member and the first working point. The distance between the first and the second working points is increased when moving at least a part of the intermediate member via the adjustment member, enabling an increased clamping force between the support member and the gripping member.

In an embodiment the first working point is arranged between the support member and the second working point. The distance between the first and the second working points is decreased when moving at least a part of the intermediate member via the adjustment member, enabling an increased clamping force between the support member and the gripping member In this embodiment, the second working point is advantageously arranged as far away form the support member as possible, i.e. as close to the load carrier bar as possible after assembly.

In an embodiment according to the present invention, the intermediate member comprises a first and a second side edge, the first side edge faces the gripping member and the second side edge faces away from the gripping member. The intermediate member further comprises and a first and a second end, the first end faces away from the support member and the second end facing towards the support member, wherein the shoulder exhibits an inclined surface extends substantially between the first and second end or substantially between the first and second side edges.

The term "working point" is intended to mean the point, area or volume at which two components abut. The distance between two working points is intended to mean the shortest distance therebetween.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended figures, where the same reference numerals will be used for similar elements, wherein.

DETAILED DESCRIPTION OF PREFFERRED EMBODIMENTS

FIGS. 1 to 5 show a load carrier foot 1 for attaching at least a part of a load carrier (not shown) to a first surface 2 of a vehicle. The first surface is in the shown example illustrated by a roof 2 of the vehicle. It should be noted however that it is within the boundaries of the present invention to use any surface of a vehicle, such as the bed of a pickup truck, a cargo transport area of a vehicle, a lorry platform, a boat platform, an airplane cargo area, or the like.

For the purpose of the following example a car is used as the vehicle, the vehicle (not shown), exhibits a first and a second longitudinal side, a front and a backside. Generally, a load carrier foot 1 is mounted at each of the longitudinal sides of the vehicle to carry and retain a load carrying bar there between. The load carrying bar (not shown) usually extends above the roof 2 between the longitudinal sides of the vehicle and is adapted to carry a suitable load for example luggage, skis or the like.

Figure 1:
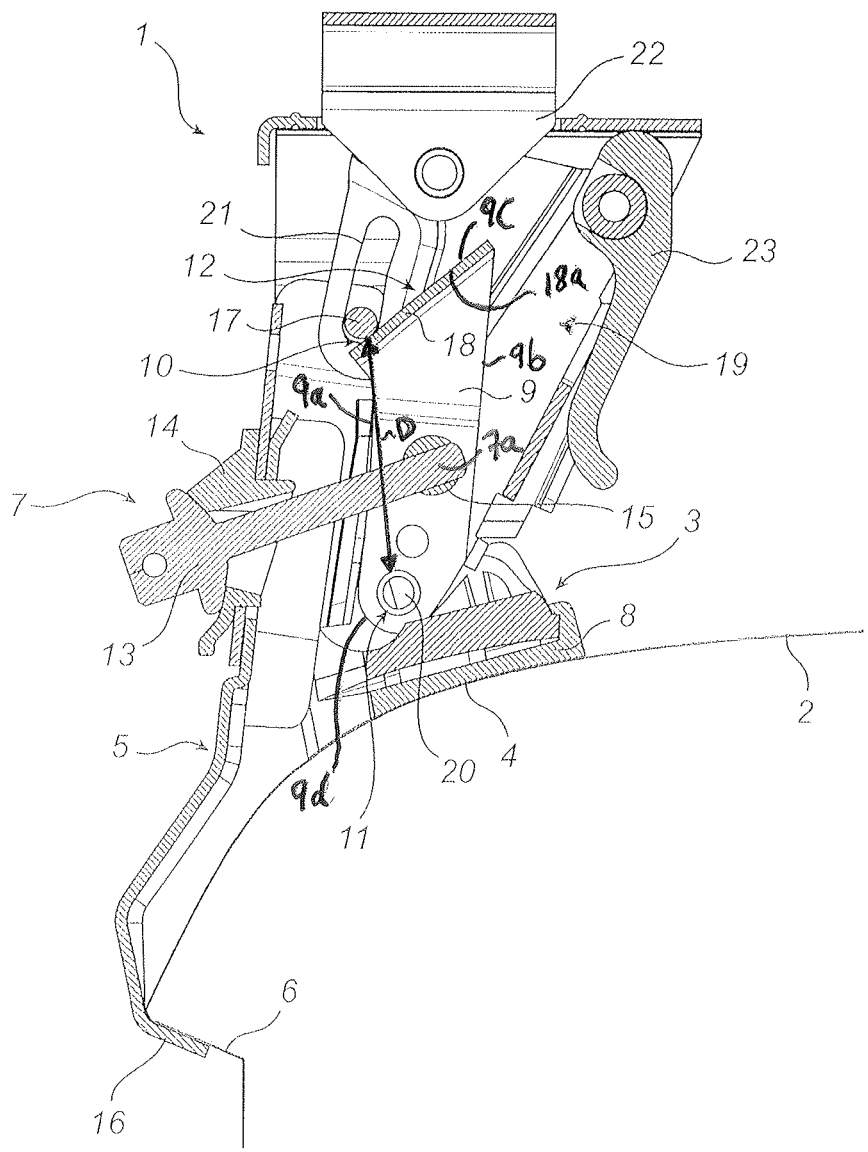
FIG. 1 shows a schematic cross-section of a foot according to the present invention in a first position for fastening a load carrier to the roof of a vehicle.

FIG. 1 shows a load carrier foot 1 comprising a support member 3, arranged to abut directly or indirectly on the roof 2 e.g. at an edge area 4 of the roof 2 of the vehicle. The support member 3 is formed from a plastic sheet and provided with a rubber pad 8, or a pad from a similar material. The support member 3 is further is pivotally connected to a first portion of an intermediate member 9 at a second working point 11. A body 19 holds an arrangement for retaining the load carrying bar, as will be described in greater detail below, to carry the weight towards the vehicle.

A gripping member 5 is arranged in working cooperation with the support member 3 and comprises a first part 16 arranged to abut the vehicle at a body fold 6 or optionally a similar protrusion/groove. In this case, the body fold 6 can be said to be positioned under the edge area 4 of the roof 2. The gripping member 5 is movable in relation to the support member 3 by means of an adjustment member 7 for imparting a clamping force between the support member 3 and the first part 16 of the gripping member 5. The imparted clamping force holds the load carrier foot 1 against the vehicle. Thus, each load carrier foot is clamping at the contact surfaces on the roof 2 and at the body fold 6.

The gripping member 5 is substantially rigid and can comprise a metal sheet, plastic sheet or other rigid material, and has a longitudinal extension. The gripping member 5 comprises a second part 17 in working cooperation with the intermediate member 9 at a first working point 10. Thus, the intermediate member 9 is in way an interlinking member between the support member 3 and the second part 17 of the gripping member 5. The gripping member 5, the intermediate member 9 and the adjustment member 7 are arranged to enable the position of the gripping member 5 with respect to the support member 3 to be adjusted, to thereby impart a desired clamping force therebetween after being mounted on the roof 2 of the vehicle.

The gripping member 5 is, in the shown embodiment according to the present invention, provided with a clamping jaw at the first part 16, which is adapted to the shape of the body fold 6. The clamping jaw can be replaceable and optionally fastened to the gripping member 5 by screws or similar. Hereby, the load carrying foot 1 may be adapted to fit different shapes of surfaces or configurations on vehicles, by using an appropriate clamping jaw. It if of course possible that the first part 16 of the gripping member 5 is attached to an attachment device of some kind, in the context of the present invention, this is still considered to abut a surface of the vehicle. The specific form and shape of the support member 3 can also be changed to any appropriate form.

Figure 2:
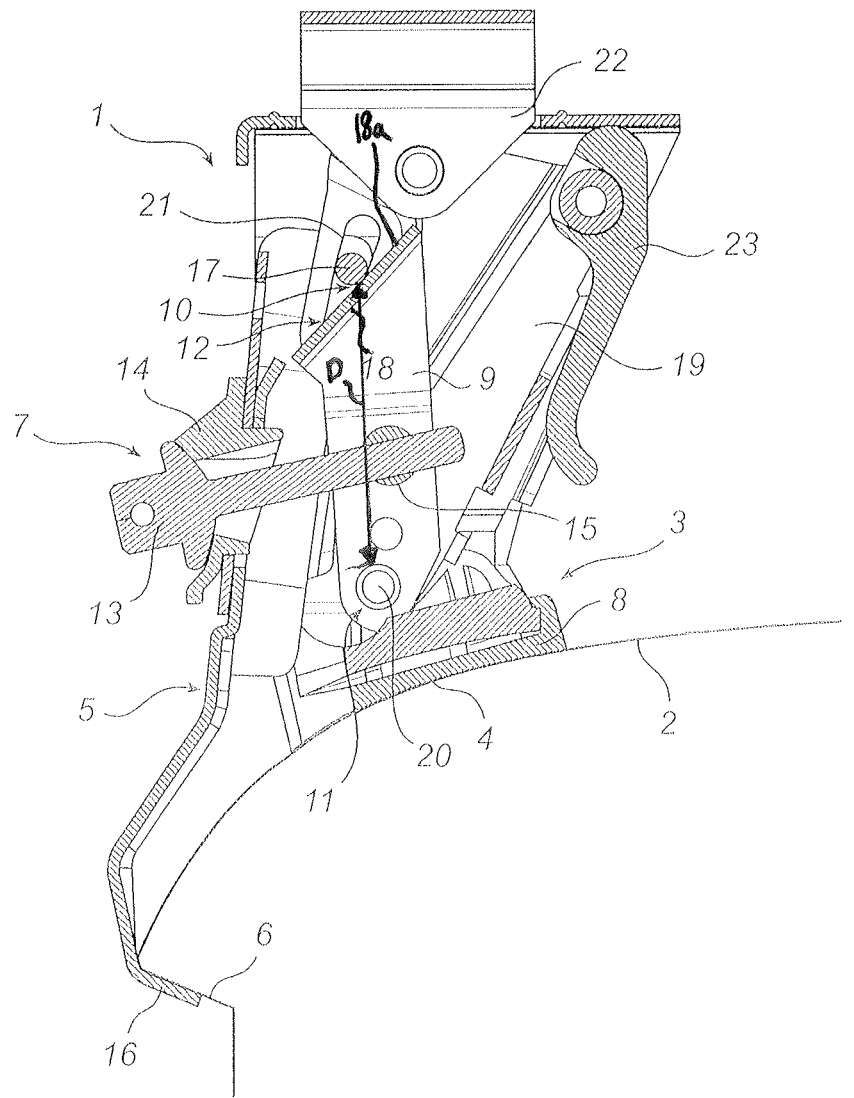
FIG. 2 shows a schematic cross-section of the foot shown in FIG. 1, in a second position, in which the load carrier foot is in a clamped position.
Figure 3:
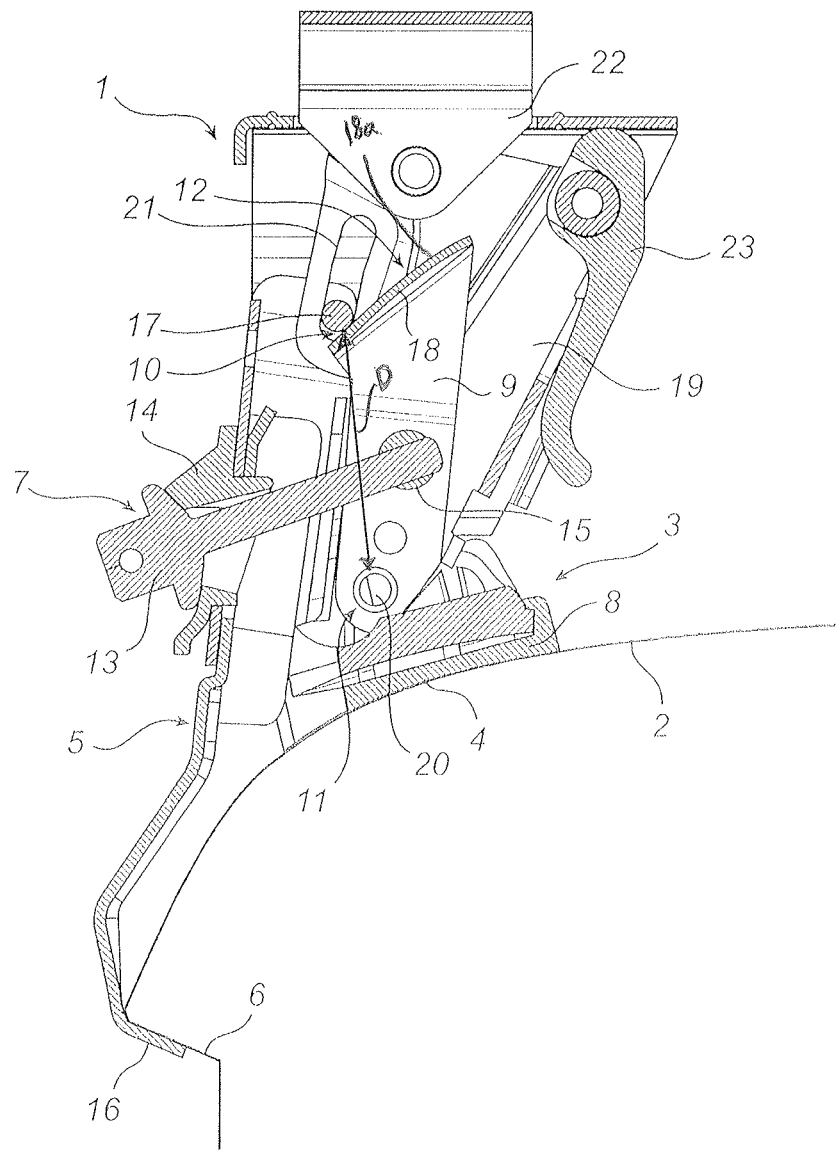
FIG. 3 shows a schematic cross-section of a load carrier foot, according to one embodiment of the present invention, in a first position having an alternative intermediate member.

In the embodiment shown in FIGS. 1-3, the intermediate member 9 is in working cooperation with the gripping member 5 and the support member 3 at a first and a second working point 10, 11, and in this embodiment, at each end part 9c, 9d of the intermediate member 9. The first and the second working point can 10, 11 can be configured differently or the same with respect to each other.

In FIG. 1, the shown embodiment according to the present invention, comprises an intermediate member 9 having a substantially longitudinal extension with a first and a second side edge 9a, 9b, a first and a second end 9c, 9d. The first and 9c of the intermediate member 9, which constitutes the first working point 10, comprises a shoulder, in the form of a flanged edge 18, defining a path 12 for the abutting second part 17 of the gripping member 5. In this case, the second part 17 of the gripping arm 5 is in the form of a cylindrical pin extending out from a surface of the gripping member 5.

The path 12 is defined by the surface 18a of the flanged edge 18, the surface 18a is in this case a flat surface. The path 12 and the surface 18a can be formed in different ways, e.g. by beveling, bending or cutting a suitable groove or trace in the intermediate member 9. The path 12 can be formed by a curved surface 18a of the shoulder, e.g. convex as shown in FIG. 3, concave, wave formed, or optionally with protrusions, e.g. saw tooth formed protrusions, to enhance the resulting clamping force in a suitable progressive way.

As is shown in FIGS. 1-3, the second end 9d of the intermediate member 9, constituting the second working point 11, is pivotally connected to the support member 3 by means of a pin 20. The pin 20 further connects the intermediate member 9 to the body 19. As such, the distance, indicated by the arrow D, between the first and the second working points 10, 11 can be varied, at which the distance and/or clamping force between the first part 16 of the gripping member 5 and the support member 3 can be varied. Of course, if the load carrier foot 1 is not mounted on a vehicle, only the distance between the first part 16 of the gripping member 5 and the support member 3 is varied, as there will be no object to absorb the relative motion therebetween.

As the second working point 11, i.e. second end 9d of the intermediate member 9 is pivotally connected to the support member 3, and the first working point 10 can be moved, the intermediate member 9 can be pivotally moved with a pendling motion. During this motion, the first end 9c of the intermediate member 9 will be transferring that sideways motion to an upward motion to the second end 17 of the gripping member 5, and the second end 17, in this case the pin, will slide on the flanged edge 18 along the path 12. Thus, the distance D between the first and the second working points 10, 11 can be varied.

Generally, the adjustment member 7 is thus arranged to enable the distance D between the first and second working points 10, 11 to be varied by moving the intermediate member 9, to thereby vary the distance and/or the clamping force between the first part 16 of said gripping member 5 and the support member 3.

The adjustment member 7 is arranged to adjust the distance between the gripping member 5 and the intermediate member 9. The adjustment member 7 extends from the intermediate member 9, at which it is threaded to a nut 15, to the gripping member 5, at a swivel connection. In the shown embodiment according to the present invention, the adjustment member 7 comprises a screw 13 which extends through an opening 14, or a bushing, in the gripping member 5 and is threaded to a nut 15 pivoted in the intermediate member 9. The screw 13 can be provided with a curved contact surface against the surface surrounding the opening 14 for tilting of the screw 13 to be able to follow the movement of the intermediate member 9 during operation. The adjustment member 7 is thus pivotally mounted to the intermediate member (9) at a pivot point 7a.

When rotating the screw 13, the distance between the gripping member 5 and the intermediate member 9 is decreased, as the distance D between the first and the second working point 10, 11 is increased. The first and second working points 10, 11 can be different as described above, however, the first and the second working points 10, 11 can optionally be of similar type. The first and the second working points 10, 11 can both be of the type as described above with respect to the first working point 10, i.e. a shoulder arranged at both the first and the second end 9c, 9d of the intermediate member 9, for example. In this case the intermediate member 9 is configured to be wedged between the support member 3 and the second part 17 of the gripping member 5, resulting in a vertical movement of the gripping member 5 during operation. Optionally the first end 9c of the intermediate member 9 is pivotally connected to the second part 17 of the gripping member 5 and the second end 9d of the intermediate member 9 comprises a shoulder and the support member 3 a corresponding part, as described above.

The function of the load carrier foot 1 will be described in greater detail below with reference to FIGS. 1 and 2. As the adjustment member 7 is rotated, the distance between the intermediate member 9 and the gripping member 5 is decreased while the distance D between the first and the second working points 10, 11 is increased.

During this operation, the gripping member 5 is guided upwards, i.e. the second end 17 of the gripping member 5 is travelling away from roof 2, providing for an increased clamping force between the support member 3 and the first part 16 of the gripping member 5. As can be seen in FIG. 2, the pin of the second end 17 of the gripping member 5 has travelled about 50% of the path 12 defined by the inclining flanged edge 18 of the first end 9c of the intermediate member 9 indicating that the load carrier foot 1 is firmly attached and mounted on the vehicle. Thus, the present invention provides for a sturdy attachment of the load carrier foot 1 to the roof 2, as the clamping force depends directly on the increased distance D between the first and the second working points 10, 11.

The intermediate member 9 is pivoted to the body 19 by means of the pin 20 as mentioned above. During rotation of the adjustment member 7, the intermediate member 9 can rotate about the pin 20 and drive the gripping member 5 upwards by exerting a lifting force on the pin of the second end 17 of the gripping member along the path 12. Simultaneously, the adjustment member 7 forces the gripping member 5 towards the intermediate member 9, resulting both in a horizontal and vertical movement of the first part 16 of the gripping member. Thereby, a sufficient clamping force is achieved to mount the load carrier foot 1 to the roof 2 of the vehicle.

To further improve the load carrier foot 1, an elongated curved trace 21, e.g. in the body 19, cooperates with the second part 17 of the gripping member 5 for guiding the gripping member 5 along a geometrically correct path.

The body 19 is in contact with the support member 3 in its lower part and connected to a bracket 22 in its upper part for connection to the load carrying bar (not shown). An eccentric lever 23 is provided for clamping the load carrying bar to the load carrier foot 1.

As can be noticed, the support member 3 is connected to the bracket 22, which is intended to attach a load carrying bar during use, and resting on the body 19. If the load carrying foot 1 should e.g. be tilted, for example during a collision or a prompt retardation, the support member 3 will be imparted with a lifting force due to the inertia of any load which is carried on the load carrying bar. The intermediate member 9 will impart a lifting force to the second part 17 of the gripping member 5. As the gripping member 5 is imparted with a lifting force, the load carrying foot 1 will only exhibit an improved clamping force between the gripping arm 5 and the support member 3, resulting in an improved attachment of the load carrying foot 1 to the vehicle. The adjustment member 7 of course maintains the intermediate member 9 at a predetermined distance from the gripping member 5.

Figure 4:
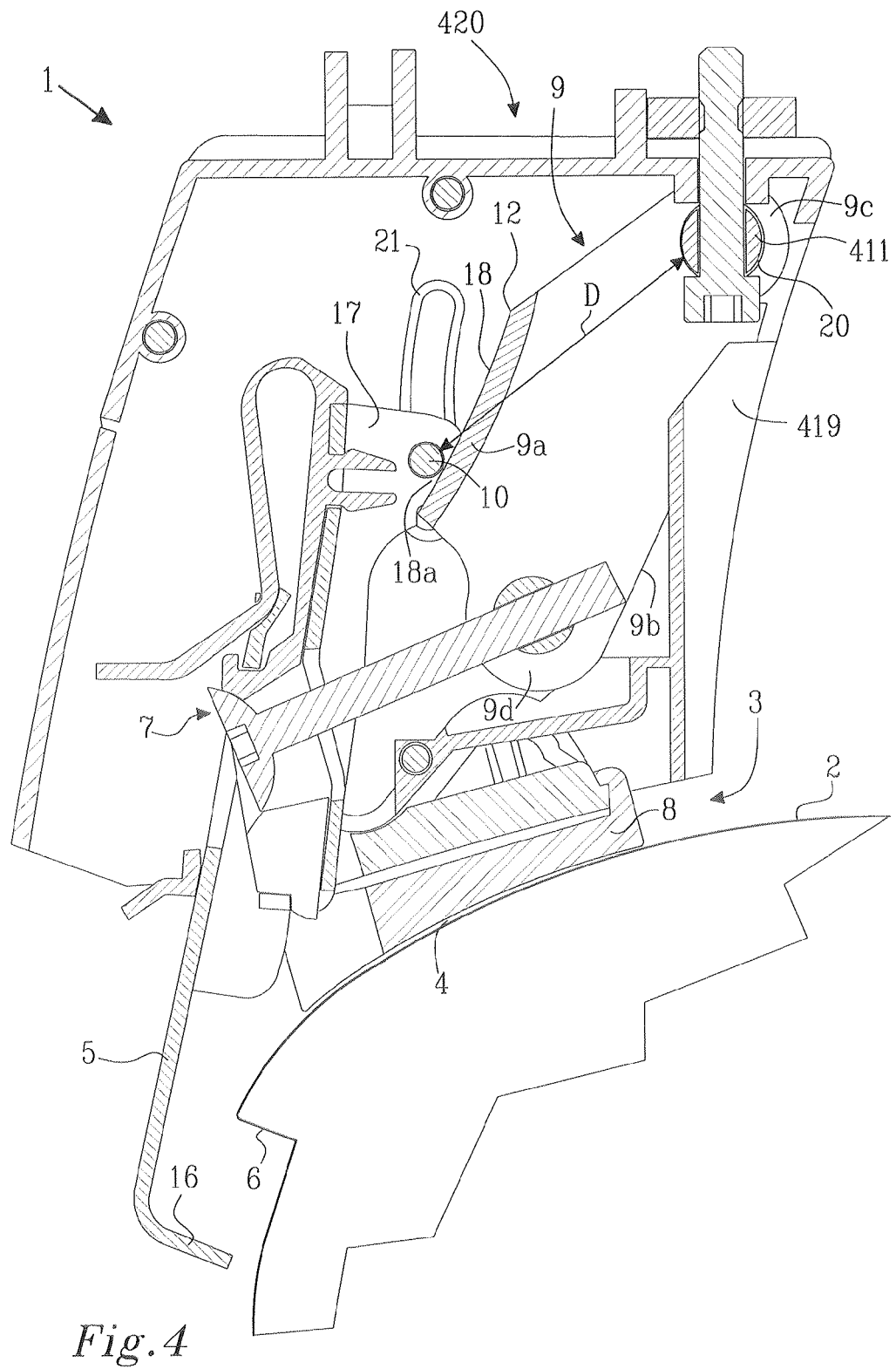
FIGS. 4-5 show a schematic cross-section of a load carrier foot according to a second embodiment of the present invention.
Figure 5:
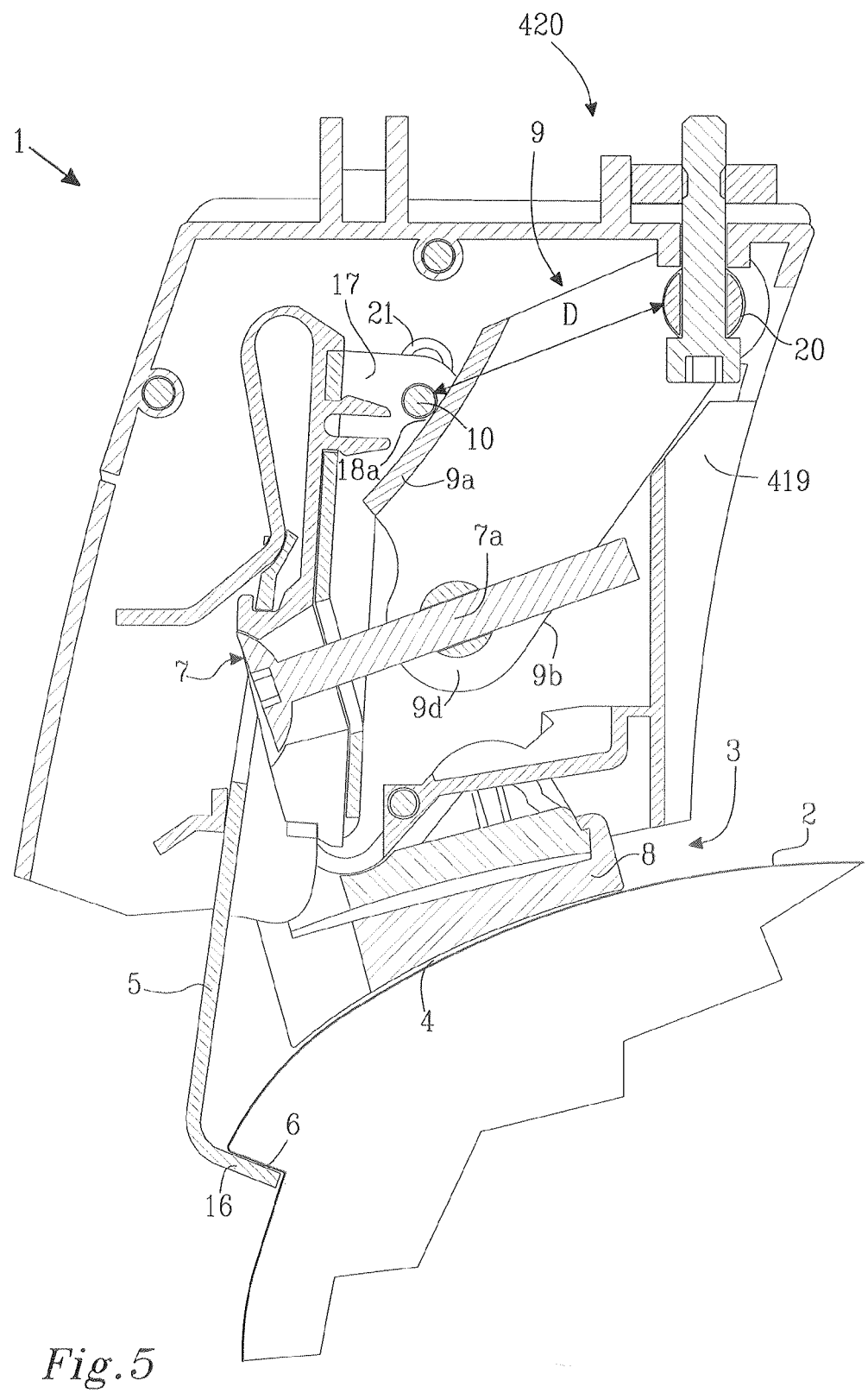

FIGS. 4-5 show an embodiment of the present invention, the same reference numbers as in the previous figures refer to the similar or identical features. FIGS. 4 and 5 shows a load carrier foot 1 comprising a support member 3, arranged to abut directly or indirectly on the roof 2 e.g. at an edge area 4 of the roof 2 of the vehicle. The support member 3 is formed from a plastic sheet and provided with a rubber pad 8, or a pad from a similar material. A body 419 holds an arrangement for retaining the load carrying bar, as will be described in greater detail below, to carry the weight towards the vehicle.

A gripping member 5 is arranged in working cooperation with the support member 3 and comprises a first part 16 arranged to abut the vehicle at a body fold 6 or optionally a similar protrusion/groove. In this case, the body fold 6 can be said to be positioned under the edge area 4 of the roof 2. The gripping member 5 is movable in relation to the support member 3 by means of an adjustment member 7 which is arranged in working cooperation with an intermediate member 9 for imparting a clamping force between the support member 3 and the first part 16 of the gripping member 5. The imparted clamping force holds the load carrier foot 1 against the vehicle. Thus, each load carrier foot is clamping at the contact surfaces on the roof 2 and at the body fold 6.

The gripping member 5 can be substantially rigid and can comprise a metal sheet, plastic sheet or other rigid material, and has a longitudinal extension. The gripping member 5 comprises a second part 17 in working cooperation with the intermediate member 9 at a first working point 10. Thus, the intermediate member 9 is in a way an interlinking member between the body 419, but cooperates with the support member, and the second part 17 of the gripping member 5. The gripping member 5, the intermediate member 9 and the adjustment member 7 are arranged to enable the position of the gripping member 5 with respect to the support member 3 to be adjusted, to thereby impart a desired clamping force therebetween after being mounted on the roof 2 of the vehicle.

The body 19 can be formed by a housing substantially enclosing at least parts of the load carrier foot, or the housing encloses the load carrier foot except for parts of the gripping member and the support member.

In the embodiment shown in FIGS. 4 and 5 the intermediate member 9 is in working cooperation with the gripping member 5 and the body 419, and thus the support member, at a first and a second working point 10, 411.

In FIGS. 4-5, the shown embodiment according to the present invention, comprises an intermediate member 9 having a substantially longitudinal extension with a first and a second side edge 9a, 9b, a first and a second end 9c, 9d. The first side 9a of the intermediate member 9, in working cooperation with the first working point 10, comprises a shoulder, in the form of a flanged edge 18, defining a path 12 for the abutting second part 17 of the gripping member 5. In this case, the second part 17 of the gripping arm 5 is in the form of a cylindrical pin extending out from a surface of the gripping member 5.

The path 12 is defined by the surface 18a of the flanged edge 18, the surface 18a is in this case a flat surface. The path 12 and the surface 18a can be formed in different ways, e.g. by beveling, bending or cutting a suitable groove or trace in the intermediate member 9. The path 12 can be formed by a curved surface 18a of the shoulder. In FIGS. 4-5 the curved surface is concave with respect to the intermediate member 9, although other forms are plausible such as convex formed, wave formed, or optionally with protrusions, e.g. saw tooth formed protrusions, to enhance the resulting clamping force in a suitable progressive way.

In the embodiment shown in FIGS. 4-5, the first end 9c of the intermediate member 9, exhibits the second working point 411. The first end 9c of the intermediate member 9 is pivotally connected to the body 419 by means of a pin 20. The support member 3 and the body 419 may be integrated in one piece, or formed by interconnected parts.

The distance, indicated by the arrow D, between the first and the second working points 10, 411 can be varied, at which the distance and/or clamping force between the first part 16 of the gripping member 5 and the support member 3 can be varied. Of course, if the load carrier foot 1 is not mounted on a vehicle, only the distance between the first part 16 of the gripping member 5 and the support member 3 is varied, as there will be no object to absorb the relative motion therebetween.

The intermediate member 9 is pivoted to the body 419 by means of the pin 20 as mentioned above. However in this embodiment, the intermediate member 9 is pivoted about the first end 9c, i.e. that end of the intermediate member which is closest to the position at which the load carrying bar is intended to be, in FIGS. 4-5 indicated with reference 420.

During rotation of the adjustment member 7, the intermediate member 9 rotates about the pin 20 and drive the gripping member 5 upwards by exerting a lifting force on the pin of the second end 17 of the gripping member along the path 12. Simultaneously, the adjustment member 7 forces the gripping member 5 towards the intermediate member 9, resulting both in a horizontal and vertical movement of the first part 16 of the gripping member. Thereby, a sufficient clamping force is achieved to mount the load carrier foot 1 to the roof 2 of the vehicle.

In contrast to the embodiment shown in FIGS. 1-3 in which the adjustment member 7 imparts a counter clock wise motion about the pivot axis, i.e. the working point 11 as the second end 9d of the intermediate member 9, the embodiment shown in FIGS. 4-5 imparts a clock wise motion about the pivot axis. I.e. the working point 411 at the first end 9c of the intermediate member 9. The distance d between the first and the second working 10, 411 point is further reduced in contrast to the embodiment shown in FIGS. 1-3, in which the distance d is increased, when the adjustment member 7 is tightened.

In the disclosed embodiments, the adjustment member 7 thus imparts either a clock wise or anti clock wise motion to the intermediate member 9 about one of the working points 11, 411.

The invention claimed is:

1. A load carrier foot for mounting at least a part of a load carrier to a first surface of a vehicle, said load carrier foot comprising:
   a support member, arranged to abut said first surface,
   a gripping member having a first part arranged to abut the vehicle at a distance from said support member,
   an intermediate member between said support member and a second part of said gripping member, and
   an adjustment member acting on said intermediate member to adjust a clamping force between said support member and said first part of said gripping member,
   wherein said intermediate member cooperates with said second part of said gripping member at a first working point and said intermediate member cooperates with said support member at a second working point located at a distance from said first working point,
   wherein said distance between said first and said second working points can be changed by moving at least a part of said intermediate member via said adjustment member to thereby vary said distance and/or said clamping force between said first part of said gripping member and said support member,
   wherein said first working point comprises a shoulder on top of said intermediate member, said shoulder having a surface defining a path, and wherein said second part of said gripping member is arranged to movably slide along said path upon movement of said at least a part of said intermediate member and said surface of said shoulder is configured to transfer a sideways motion of said intermediate member to an upward motion of said second part of said gripping member.

2. The load carrier foot according to claim 1, wherein said intermediate member is pivotally connected to said load carrier foot at said second working point.

3. The load carrier foot according to claim 2, wherein said intermediate member is pivotally connected to said support member at said second working point.

4. The load carrier foot according to claim 1, wherein said adjustment member is pivotally mounted to said intermediate member at a pivot point, and wherein said pivot point is arranged between said shoulder and said support member.

5. The load carrier foot according to claim 1, wherein said adjustment member is pivotally mounted to said intermediate member at a pivot point, and wherein said first working point is arranged between said support member and said second working point.

6. The load carrier foot according to claim 1, wherein said second working point is arranged between said support member and said first working point.

7. The load carrier foot according to claim 6, wherein said distance between said first and said second working points is increased when moving at least a part of said intermediate member via said adjustment member, thereby increasing said clamping force.

8. The load carrier foot according to claim 1, wherein said first working point is arranged between said support member and said second working point.

9. The load carrier foot according to claim 8, wherein said distance between said first and said second working points is decreased when moving at least a part of said intermediate member via said adjustment member, thereby increasing said clamping force.

10. The load carrier foot according to claim 1, wherein said intermediate member comprises a first and a second side edge, said first side edge facing said gripping member and said second side edge facing away from said gripping member, said intermediate member further comprises and a first and a second end, said first end facing away from said support member and said second end facing towards said support member, wherein said shoulder exhibits an inclined surface extending substantially between said first and second end or substantially between said first and second side edges.

11. The load carrier foot according to claim 10, wherein said inclined surface is arched or flat.

12. The load carrier foot according to claim 10, wherein said inclined surface inclines so that said distance between said working points is increased when said at least a part of said intermediate member is moved in a direction towards said gripping member.

13. The load carrier foot according to claim 1, wherein said second part comprises a pin.

14. The load carrier foot according to claim 1, wherein said adjustment member extends at least between said intermediate member and said gripping member.

15. The load carrier foot according to claim 14, wherein said adjustment member extends through an opening in said gripping member, said adjustment member being in working cooperation with said opening in said gripping member.

16. The load carrier foot according to claim 1, wherein said adjustment member is pivotally connected to said intermediate member.

17. The load carrier foot according to claim 15, wherein said adjustment member is pivotally mounted to said gripping member.

18. The load carrier foot according to claim 1, wherein said adjustment member is arranged to move at least a part of said intermediate member by means of a rotating motion of said adjustment member.

19. The load carrier foot according to claim 13, further comprising a body that extends from said support member to a bracket for connection to a load carrier bar, said body being provided with a guide track cooperating with said pin for guiding said gripping member along a geometrically correct path.

* * * * *